US010144460B2

(12) United States Patent
Hellholm et al.

(10) Patent No.: US 10,144,460 B2
(45) Date of Patent: Dec. 4, 2018

(54) SUSPENSION DEVICE FOR TRACKED VEHICLE (71) Applicant: BAE Systems Hägglunds Aktiebolag, Örnsköldsvik (SE)

(72) Inventors: Björn Hellholm, Arnäsvall (SE); Björn Nordberg, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 149 days.

(21) Appl. No.: 14/787,419

(22) PCT Filed: May 7, 2014

(86) PCT No.: PCT/SE2014/050563
§ 371 (c)(1),
(2) Date: Oct. 27, 2015

(87) PCT Pub. No.: WO2014/182235
PCT Pub. Date: Nov. 13, 2014

(65) Prior Publication Data
US 2016/0068205 A1 Mar. 10, 2016

(30) Foreign Application Priority Data

May 8, 2013 (SE) ...................................... 1350562

(51) Int. Cl.
*B62D 55/104* (2006.01)
*B62D 55/112* (2006.01)
(Continued)

(52) U.S. Cl.
CPC ............. *B62D 55/104* (2013.01); *B60G 3/08* (2013.01); *B60G 3/145* (2013.01);
(Continued)

(58) Field of Classification Search
CPC .. B62D 55/104; B62D 55/112; B62D 55/116; B60G 11/30
See application file for complete search history.

(56) References Cited

U.S. PATENT DOCUMENTS 3,430,790 A * 3/1969 Beltrami ................ B62D 49/08
180/41
3,443,654 A * 5/1969 Schoonover ......... B62D 53/005
180/9.44
(Continued)

FOREIGN PATENT DOCUMENTS

CA 2737173 A1 10/2012
GB 2411160 A * 8/2005 ............... B60K 6/48
(Continued)

OTHER PUBLICATIONS

International Preliminary Report on Patentability received for PCT Patent Application No. PCT/SE2014/050563, dated Nov. 19, 2015, 9 pages.
(Continued)

*Primary Examiner* — Paul N Dickson
*Assistant Examiner* — Daniel S Yeagley
(74) *Attorney, Agent, or Firm* — Morrison & Foerster LLP (57) ABSTRACT The invention relates to a suspension device for tracked vehicles, which vehicle comprises at least one pair of track assemblies, where each track assembly of the pair of track assemblies comprises a track support beam, at least one drive wheel, a plurality of support wheels and an endless track, wherein the drive wheel and the plurality of support wheels are rotatably secured to the track support beam. The drive wheel is arranged to drive the endless track running over the at least one drive wheel and the plurality of support wheels. The suspension device comprises a first suspension configuration constituting a support wheel suspension con-
(Continued)

figuration configured to resiliently secure the support wheels to the track support beam, and a second suspension configuration configured to connect the track assembly pair with a centrally arranged center beam. The invention also relates to a tracked vehicle.

17 Claims, 5 Drawing Sheets

(51) Int. Cl.

| | | |
|---|---|---|
| *B62D 55/116* | (2006.01) | |
| *B60G 3/08* | (2006.01) | |
| *B60G 3/14* | (2006.01) | |
| *B60G 17/0165* | (2006.01) | |
| *B60G 21/073* | (2006.01) | |
| *B62D 55/108* | (2006.01) | |
| *B62D 55/065* | (2006.01) | |

(52) U.S. Cl.
CPC ....... *B60G 17/0165* (2013.01); *B60G 21/073* (2013.01); *B62D 55/108* (2013.01); *B62D 55/112* (2013.01); *B62D 55/116* (2013.01); *B60G 2200/13* (2013.01); *B60G 2200/14* (2013.01); *B60G 2206/11* (2013.01); *B60G 2206/124* (2013.01); *B60G 2300/083* (2013.01); *B60G 2300/32* (2013.01); *B60G 2800/019* (2013.01); *B62D 55/065* (2013.01); *B62D 55/1125* (2013.01)

(56) References Cited

U.S. PATENT DOCUMENTS

| | | | | |
|---|---|---|---|---|
| 3,473,619 A * | 10/1969 | Dion | ................... | A01G 23/006 180/14.4 |
| 3,602,470 A * | 8/1971 | Reynolds | ........... | B62D 55/1125 180/9.1 |
| 5,373,909 A * | 12/1994 | Dow | .................... | B62D 55/244 180/235 |
| 6,247,547 B1* | 6/2001 | Lemke | .................. | B62D 55/10 180/9.5 |
| 6,951,260 B1 | 10/2005 | Isley | | |
| 7,562,727 B1* | 7/2009 | Hoffart | .............. | B62D 55/1125 180/9.1 |
| 8,056,656 B2* | 11/2011 | Todd | ..................... | B62D 55/04 180/9.1 |
| 2003/0222432 A1* | 12/2003 | Bowers | .................... | B60G 5/00 280/677 |
| 2007/0169968 A1 | 7/2007 | Todd et al. | | |
| 2008/0156548 A1 | 7/2008 | Mallette et al. | | |

FOREIGN PATENT DOCUMENTS

| | | |
|---|---|---|
| NL | 9201553 A | 4/1994 |
| WO | 1991/07306 A1 | 5/1991 |
| WO | 1998/40266 A1 | 9/1998 |
| WO | 2006/066406 A1 | 6/2006 |

OTHER PUBLICATIONS

International Search Report and Written Opinion received for PCT Application No. PCT/SE2014/050563, dated Sep. 1, 2014, 12 pages.

Extended European Search Report received for European Patent Application No. 14794369.0, dated Jan. 12, 2017, 7 pages.

Office Action received for European Patent Application No. 14794369.0, dated Nov. 14, 2017, 4 pages.

\* cited by examiner

SUSPENSION DEVICE FOR TRACKED VEHICLE

CROSS REFERENCE TO RELATED APPLICATIONS

This application is a U.S. National Stage patent application of PCT/SE2014/050563, filed on May 7, 2014, which claims priority to Swedish Patent Application No. 1350562-3, filed on May 8, 2013, the entire contents of which are incorporated herein by reference.

FIELD OF THE INVENTION

The present invention relates to a suspension device for tracked vehicles. The present invention also relates to a tracked vehicle.

BACKGROUND OF THE INVENTION

Tracked vehicles are provided with so called support wheel suspension to improve mobility and comfort. In such a tracked vehicle, the vehicle has a pair of track assemblies; in articulated tracked vehicles each vehicle unit has a pair of track assemblies. Each track assembly in the pair of track assemblies comprises a track support beam, at least one drive wheel, a plurality of support wheels and an endless track. Said at least one drive wheel and said plurality of support wheels are rotatably secured to said track support beam. Said drive wheel is configured to drive said endless track running over the at least one drive wheel and said plurality of support wheels. The support wheel suspension of the vehicle is configured to resiliently secure said support wheels to said track support beam.

Such a support wheel suspension configuration comprises rocker arms connecting said plurality of support wheels to said track support beam, wherein said rocker arms are configured such that forces acting on said plurality of support wheels cause resilient oscillation of said rocker arms so that the tracked vehicle can pass over small obstacles without the vehicle chassis being affected significantly, resulting in increased comfort for the vehicle operator.

For larger obstacles and rough terrain such support wheel suspension is not effective to the same extent, resulting in that comfort is not maintained and that the chassis of the vehicle hereby tend to lean which may cause difficulties in transporting cargo on the vehicle in such terrain.

Consequently, there is a need to present improvements in suspension systems for tracked vehicles.

SUMMARY OF THE INVENTION

It is an object of the present invention to provide a suspension device for a tracked vehicle enabling improved comfort when driving the vehicle.

A further object of the present invention is to provide a suspension device for a tracked vehicle that facilitates the transport of cargo when driving in rough terrain.

A further object of the present invention is to provide a suspension device for a tracked vehicle which allows the vehicle to be driven at higher speed, thereby enabling increased productivity of a tracked work vehicle, such as a forestry vehicle.

These and other objects, which will become apparent from the following description, are achieved by means of a suspension device for a tracked vehicle, and a tracked vehicle comprising such a suspension device as described below. Preferred embodiments of the suspension device and the tracked vehicle are defined below.

According to the invention, the objects are achieved by a suspension device for tracked vehicles, which vehicle comprises at least one pair of track assemblies, where each track assembly of the pair of track assemblies comprises a track support beam, at least one drive wheel, a plurality of support wheels and an endless track, wherein said at least one drive wheel and said plurality of support wheels are rotatably secured to said track support beam, wherein said at least one drive wheel is arranged to drive said endless track running over the at least one drive wheel and said plurality of support wheels, wherein the suspension device comprises a support wheel suspension configuration configured to resiliently secure said support wheels to said track support beam, and a suspension configuration configured to connect said track assembly pair with a centrally arranged centre beam. Thus, the suspension device comprises a first suspension configuration constituting a support wheel suspension configuration configured to resiliently secure said support wheels to said track support beam, and a second suspension configuration configured to connect the track assembly pair with a centrally arranged centre beam.

This enables improved comfort and improved mobility during propulsion of the vehicle since the second suspension configuration, which according to one alternative is constituted by a hydraulic suspension configuration, such as a gas hydraulic suspension configuration, hereby may be combined with the support wheel suspension, wherein the second suspension configuration according to one alternative is configured to cooperate with the support wheel suspension configuration based on the force acting on the track assembly.

Preferably, the support wheel suspension configuration is configured to resiliently secure all support wheels to the track support beam. This means all each of the wheels that during normal operation of the vehicle are intended to indirectly contact the ground via the endless track and thus to absorb force from the ground are resiliently secured to the track support beam.

Furthermore, this reduces load in form of vibrations, shocks and impacts on the vehicle structure. Furthermore, when the second suspension configuration is constituted by a gas hydraulic suspension configuration, control of the gas hydraulic suspension configuration renders possible compensation of the inclination of the vehicle so that the centre of gravity of the vehicle is shifted, for example at side slope driving. Consequently, the hydraulic suspension configuration enables facilitation of transportation of cargo when driving the vehicle in rough terrain. Since the vehicle by means of said second suspension configuration to a higher extent may be held horizontal and since the position of its centre of gravity may be shifted to facilitate cargo transport, the vehicle may be driven at higher speed. Thereby, the productivity of forestry vehicles provided with the suspension device according to the invention may be increased.

In one embodiment of the suspension device, said support wheel suspension configuration comprises rocker arms connecting each of said plurality of support wheels and said track support beam, wherein said rocker arms are configured such that forces acting on said plurality of support wheels cause resilient oscillation of said rocker arms. Thereby, efficient suspension of track assemblies for increased comfort and mobility during propulsion of the vehicle is provided.

In one embodiment of the suspension device, said second suspension configuration is configured to cooperate with said support wheel suspension configuration based on force acting on said pair of track assemblies. The cooperation between the support wheel suspension configuration and the second suspension configuration serves to improve the comfort and mobility during propulsion of the vehicle. Furthermore, the load on the vehicle structure in form of vibrations, shocks and impacts is hereby reduced.

In one embodiment of the suspension device, said cooperation is arranged to take place such that force acting on said pair of track assemblies is absorbed by said support wheel suspension configuration and any remaining force transmitted to said track support beam is absorbed by said second suspension configuration. The cooperation between the support wheel suspension configuration and the second suspension configuration serves to improve the comfort and mobility during propulsion of the vehicle. Furthermore, the load on the vehicle structure in form of vibrations, shocks and impacts is hereby reduced.

In one embodiment of the suspension device, said second suspension configuration comprises a pair of springs for each track assembly, which pair of springs comprises a front and a rear spring strut. This improves the comfort and the mobility during propulsion of the vehicle whereby the front and rear spring struts enable improved obstacle handling and stable suspension distribution. Furthermore, the load on the vehicle structure in form of vibrations, shocks and impacts is hereby reduced.

Thus, preferably the second suspension configuration is constituted by a gas hydraulic suspension configuration. This enables, through the control of the gas hydraulic suspension configuration, compensation of the inclination of the vehicle so that the centre of gravity of the vehicle is shifted, for example at side slope driving.

In one embodiment of the suspension device, said gas hydraulic suspension configuration comprises a pair of hydraulic cylinders for the respective track assembly, which pair of hydraulic cylinders comprises a front and a rear hydraulic cylinder arranged to be connected such that hydraulic flow is distributed between the front and the rear hydraulic cylinder based on the force acting on the front and rear hydraulic cylinder, respectively. This enables so called bogie function of the track assemblies of the vehicle such that the centre beam of the vehicle to a greater extent can be withheld in parallel with the ground plane during propulsion of the vehicle, whereby comfort is improved. Furthermore, the mobility of the vehicle is hereby improved, thus enabling passage over larger obstacles and ditches. Furthermore, this renders possible to withhold the centre beam of the vehicle essentially horizontal, and so to withhold cargo essentially horizontal during passage of obstacles of a certain size.

In one embodiment of the suspension device, said hydraulic flow is arranged to be distributed such that the one of said front and rear hydraulic cylinders that absorbs the relatively higher force is compressed and the other is correspondingly expanded by hydraulic flow flowing from one of the hydraulic cylinders to the other, whereby an angle is formed between said track support beam and said centre beam. Hereby, a so called bogie function of the track assemblies of the vehicle is provided, such that the centre beam of the vehicle to a higher extent can be withheld in parallel with the ground plane when the vehicle passes an obstacle having a size that causes the support wheel suspension to "bottom out", i.e. causing maximum deflection of the support wheels passing over the obstacle, such that the track assembly rises, whereby said remaining force that is transmitted to and acts on the hydraulic cylinder passing the obstacle is compressed while the other hydraulic cylinder of the track assembly is correspondingly expanded when driving the vehicle. Hereby comfort is improved an and transportation of cargo is facilitated.

In one embodiment of the suspension device, said pair of track assemblies is configured to be secured to said centre beam via a track assembly suspension configuration comprising said suspension configuration. Hereby an effective track assembly suspension structure for improved comfort and mobility is provided.

In one embodiment of the suspension device, said track assembly suspension configuration comprises a front trailing arm configuration and a rear trailing arm configuration for the respective track assembly, wherein the front trailing arm configuration at one end is articulately connected at a lower attachment of a front region of said centre beam and at the other end at a front region of said track support beam, and wherein the rear trailing arm configuration at one end is articulately connected at a lower attachment of a rear region of said centre beam and in the another end at a rear region of said track support beam. Hereby an effective track assembly suspension structure for improved comfort and mobility as well as effective absorption of shock is provided.

In one embodiment of the suspension device, said front hydraulic cylinder is at one end pivotally connected to a front side region of said centre beam and at the other end to a front region of said track support beam, in connection with said front trailing arm configuration, and wherein said rear hydraulic cylinder at one end is pivotally connected to a rear side region of said centre beam and at the other end to a rear region of said track support beam. Hereby an effective track assembly suspension structure for improved comfort and mobility is provided.

In one embodiment of the suspension device, at least one of said front and rear trailing arm configurations is designed as an A-arm. This provides for efficient absorption of impact forces from the front.

In one embodiment of the suspension device, said track support beam is a skid beam. Use of a skid beam enables easy mounting of bushings for trailing arms. Furthermore, the skid beam offers load support when the support wheels of the support wheel suspension bottom out, whereby the skid beam acts as a ski.

In one embodiment the suspension device comprises control means configured to control said suspension configuration based on information received from inclination determining means. This allows for inclination compensation and consequently shifting of the centre of gravity of the vehicle, for example during side slope driving, so that transportation of cargo is facilitated. Furthermore, the comfort during propulsion of the vehicle is improved.

In one embodiment of the suspension device, said control means is configured to control said suspension configuration such that the position of the track assemblies relative to the centre beam is adjusted to compensate for inclination. This enables efficient inclination compensation and consequently shifting of the centre of gravity of the vehicle, for example a side slope driving, such that transportation of cargo is facilitated. Furthermore, the comfort during propulsion of the vehicle is improved.

BRIEF DESCRIPTION OF THE DRAWINGS

The present invention will be better understood by reference to the following detailed description when read in conjunction with the accompanying drawings, wherein like reference numerals refer to like parts throughout the various views, and in which:

FIGS. 3b and 3c schematically illustrate a front view of the rear vehicle unit in FIG. 3a;

DETAILED DESCRIPTION OF THE INVENTION

Herein, the term "link" refers to a communication link which may be a physical connection, such as an opto-electronic communication cable, or a non-physical connection, such as a wireless connection, for example a radio or microwave link.

Herein, the term "track support beam" refers to a structural element arranged to support ground-engaging means such as e.g. an endless track as well as drive wheel and support wheels.

Herein, the term "track assembly" refers to a unit of the tracked vehicle comprising track support beam, drive wheel and support wheels as well as a circumferential endless track, which unit is arranged to comprise ground-engaging means and configured to propel the vehicle and thus form at least part of a drive unit of the tracked vehicle.

Herein, the term "track assembly pair" refers to opposite track assemblies of a vehicle unit of the vehicle, one track assembly constituting a right track assembly and the opposite track assembly constituting a left track assembly.

Herein, the term "articulated vehicle" (eng. articulated vehicle) refers to a vehicle with at least a front and a rear vehicle unit which are pivotable relative to each other about at least one joint.

Figure 1:
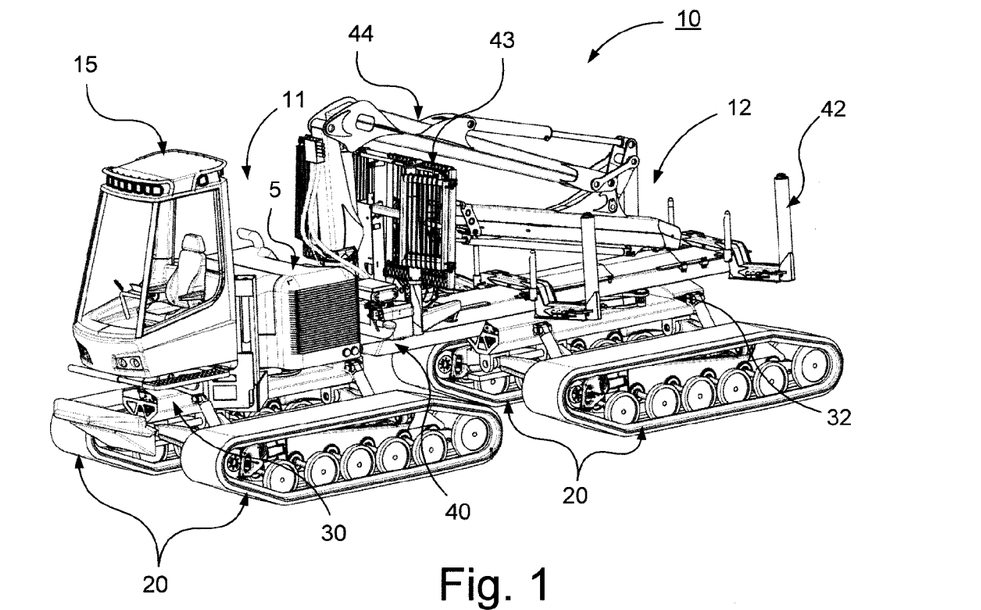
FIG. 1 schematically illustrates a perspective view of a tracked vehicle according to an embodiment of the invention.

Referring to FIG. 1, a tracked vehicle 10 according to the present invention is illustrated, provided with a front vehicle unit 11 and a rear vehicle unit 12.

Each of the front and rear vehicle unit comprises a track assembly pair 20. Said track assembly pair 20 is constituted or comprised of a drive unit pair. Said track assembly pair 20 comprises two track assemblies 21 arranged on opposite sides of the vehicle. The respective track assembly 21 is constituted or comprised of a drive unit. The respective track assembly 21 is constituted of a driving track assembly and is arranged for propulsion of the vehicle. The respective track assembly pair 20 is connected to an intermediate centre beam 30, 32, such as a chassis beam.

Said centre beam 30, 32 of the respective vehicle unit 11, 12 is arranged to support vehicle structure, e.g. in form of a vehicle cabin, power supplies, load carrying structure and a crane.

According to this configuration of the vehicle 10, the centre beam 30 of the front vehicle unit 11 is arranged to support a vehicle cabin 15 and a power supply 5, such as an internal combustion engine, where the internal combustion engine according to one embodiment is constituted of a diesel engine.

According to this configuration of the vehicle 10, the centre beam 30, 32 of the front and rear vehicle units 11, 12 is arranged to support a load-carrying structure comprising a load-carrying frame 40, where said load-carrying frame 40 according to this embodiment is configured to support a U-beam configuration 42 or a load beam configuration 42 for supporting timber and a loading gate 43. The load-carrying frame is according to this embodiment also arranged to support a crane 44 for loading/unloading of timber. The load-carrying frame 40 is configured to distribute load substantially centrally over the front and rear vehicle units 11, 12.

The exemplified vehicle 10 is a tracked forestry vehicle in form of a forwarder intended to transport timber from a harvesting site to a collection site. The vehicle 10 according to the present invention may be constituted by any suitable tracked vehicles. According to one embodiment, the vehicle 10 is a harvester intended for cutting timber.

The exemplified vehicle 10 is a diesel-electric driven vehicle. The vehicle 10 may according to one alternative have any suitable power supply for the propulsion of the vehicle. The vehicle 10 is according to one alternative a hybrid-powered vehicle. The vehicle 10 is according to one alternative electrically driven, where power according to one alternative is supplied by means of an energy storage device such as a battery unit, fuel cell or capacitor unit. The vehicle comprises a suspension device described below with reference to FIG. 2-7.

Figure 2:
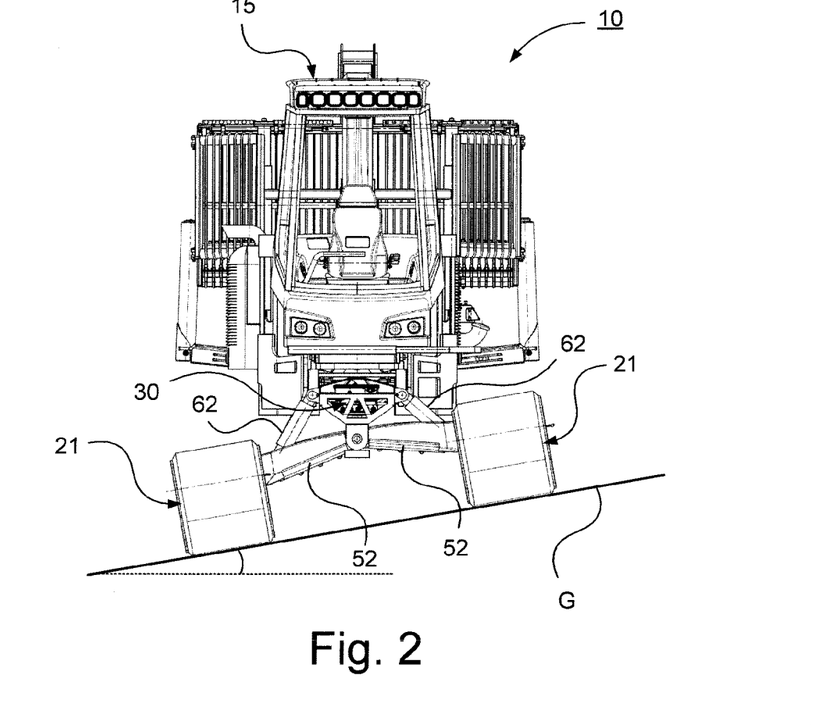
FIG. 2 schematically illustrates a front view of the tracked vehicle in FIG. 1.

FIG. 2 schematically illustrates a front view of the tracked vehicle in FIG. 1 during side slope driving, wherein control of the vehicle suspension device enables the centre beam of the vehicle and thus the load-carrying frame of the vehicle to be kept substantially horizontal despite that track assemblies of the vehicle are inclined with a side angle. The control of the vehicle suspension device is described in more detail with reference to FIG. 7.

Figure 3A:
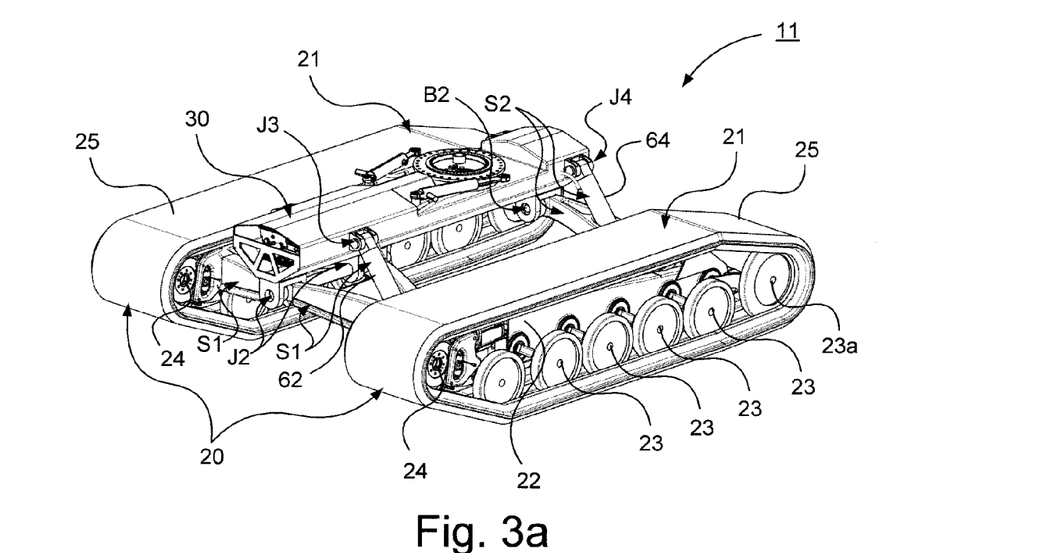
FIG. 3a schematically illustrates a perspective view of a rear vehicle unit of the tracked vehicle in FIG. 1.
Figure 3B:
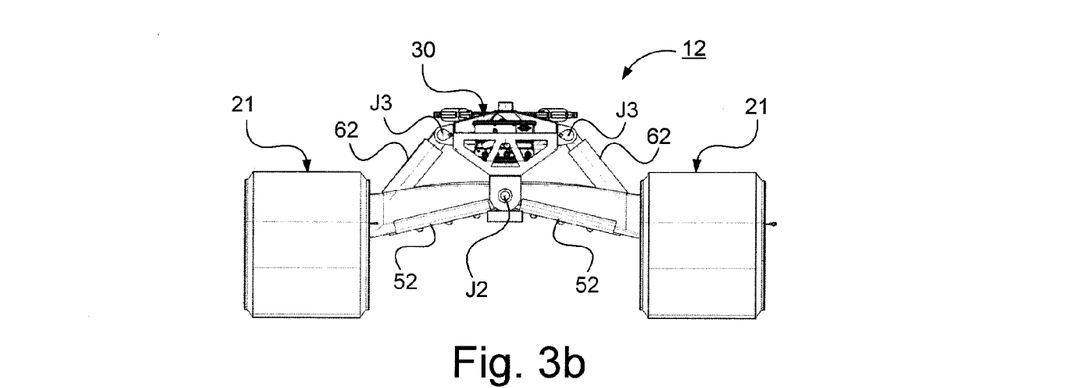
Figure 3C:
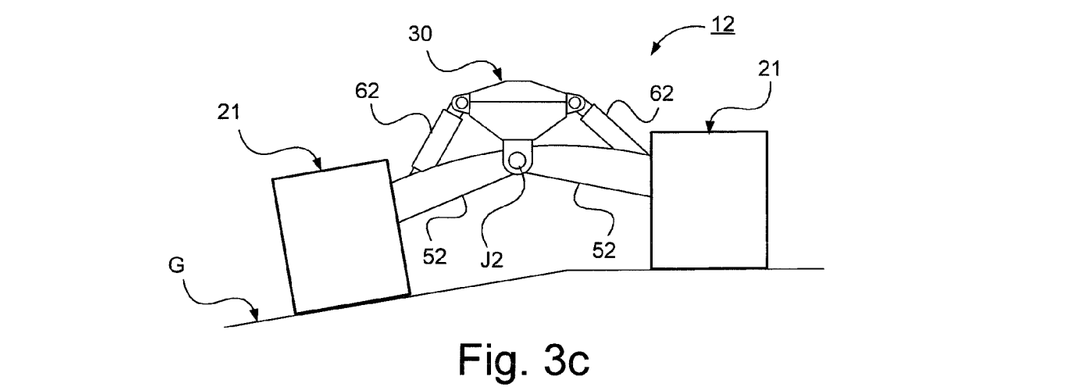
Figure 4:
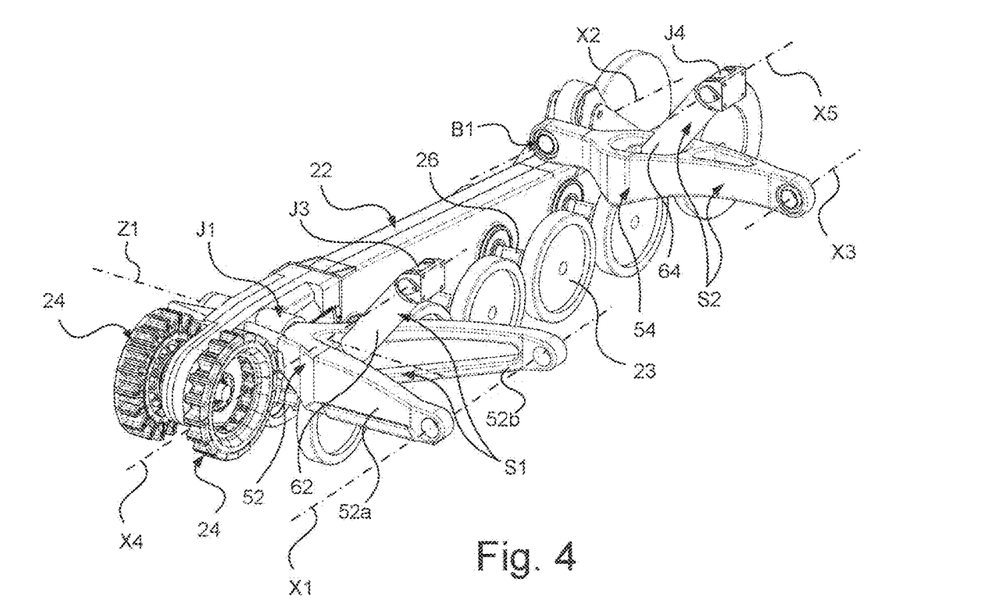
FIG. 4 schematically illustrates a perspective view of a part of a track assembly with a suspension device of the present invention.
Figures 5A, 5B:
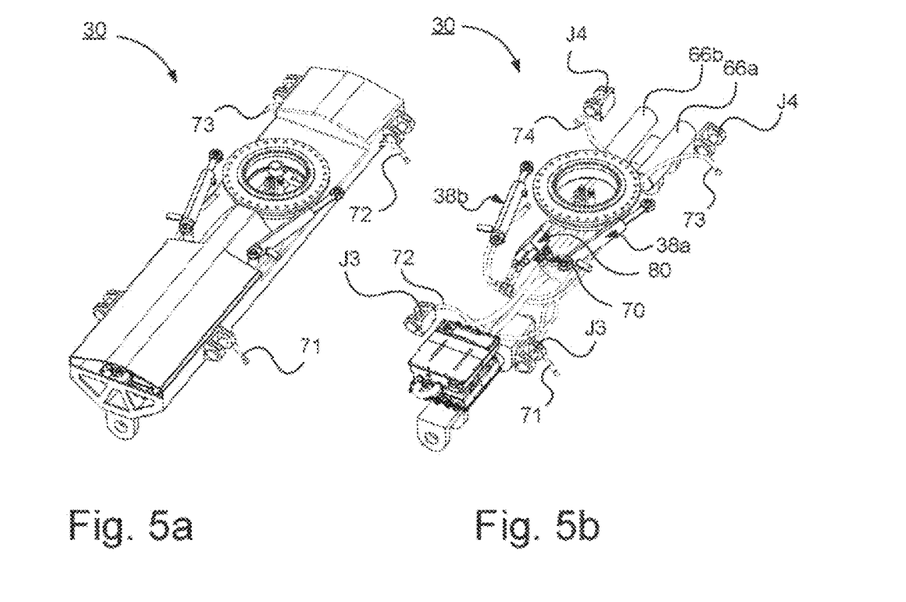
FIG. 5a schematically illustrates a perspective view of a centre beam for connection of the suspension device of the present invention.
FIG. 5b schematically illustrates a perspective view of the centre beam in FIG. 6a without housing.

FIG. 3a schematically illustrates a perspective view of a rear vehicle unit of the tracked vehicle in FIG. 1, FIGS. 3b and 3c a front view of the rear vehicle unit in FIG. 3a, FIG. 4 a perspective view of a part of a track assembly provided with the suspension device of present invention, FIG. 5a a perspective view of a centre beam for connection of the suspension device, and FIG. 5b a perspective view of the centre beam in FIG. 5a without housing.

Referring to FIG. 3a-c, there is shown a track assembly pair connected to an intermediate centre beam and comprising a suspension device of the present invention. In more detail, there is shown a track assembly pair intended for a front vehicle unit, such as said front vehicle unit is exemplified with reference to FIG. 1. FIG. 5a-b show said centre beam arranged for connection to said track assemblies.

Referring to FIG. 3a, there is shown a front vehicle unit 11 comprising a drive unit pair 20 connected to an intermediate centre beam 30.

In more detail, there is shown a front vehicle unit 11 with reference to FIG. 2 with a drive unit pair 20 in form of a track assembly pair 20 and with a centre beam connected to and configured for suspension of the centre beam 30.

The respective track assembly 21 is arranged to drive the vehicle unit 12. The respective track assembly 21 comprises a track support beam 22, which is here constituted by a skid beam. The respective track assembly further comprises a set of support wheels 23, 23a, at least one drive wheel 24, and an endless track 25. Said endless track 25 is arranged to run over the at least one drive wheel 24 and said set of support wheels 23, 23a.

Said set of support wheels 23, 23a and the at least one drive wheel 24 are arranged to be rotatably supported by said track support beam 22 in a suitable manner. Said set of support wheels 23, 23a is arranged in a pair configuration, meaning that the respective support wheels 23, 23a in each pair configuration is arranged on opposite sides of said track support beam 22. The support wheel arranged at the very rear of the track support beam 22 also has a track tension wheel function and is constituted by a tension wheel.

Said track assembly 21 further comprises also an electrical drive unit (not shown) operatively coupled to said at least one drive wheel. According to one alternative, the respective track assembly comprises an electrical drive unit. According to one alternative, said electrical drive unit is arranged in said track support beam 22 of said track assembly 21.

Said centre beam is arranged to support vehicle structures. Said centre beam comprises attachment points arranged underneath and on the side of said centre beam, wherein said attachment points are configured for attachment of track assembly and track assembly suspension.

In more detail, said centre beam 30 is arranged for connection to and suspension of said two opposite track assemblies 21, i.e. said track assembly pair 20, via a track assembly suspension configuration described below. The two track assemblies 21 of the track assembly pair 20 are arranged on opposite sides of the centre beam 30 so that the centre beam 30 is arranged in between said track assemblies 21 of the track assembly pair 21 and such that the main extension direction of the centre beam 30 is substantially parallel to the main extension direction of the respective track assembly 21 of the track assembly pair 20, as shown in FIG. 3. The same applies to the rear vehicle unit 12 shown in FIG. 2.

According to one alternative, said centre beam 30, 32 is constituted by a chassis beam arranged to support chassis structure.

According to the embodiment shown in FIG. 4, said track assembly 21 comprises a drive wheel pair 24 comprising a first drive wheel 24 and a second drive wheel 24 arranged on opposite sides of said track support beam 22. The drive wheel pair 24 is arranged to be driven by a driving shaft.

The suspension device comprises a support wheel suspension configuration configured to resiliently secure said support wheels 23, 23a to said track support beam 22. Said support wheel suspension configuration comprises rocker arms 26 connecting said plurality of support wheels 23, 23a with said track support beam 22. Said rocker arms 26 are configured such that forces acting on said plurality of support wheels 23, 23a cause resilient oscillation of said rocker arms 26. The resilient function of the support wheel suspension configuration of said track assembly will be described in more detail with reference to FIG. 6a-b.

The tension wheels 23a have a slightly different type of suspension than the other support wheels 23. Each tension wheel 23a is suspended by means of a track tension arrangement attached to a rubber bushing similar to the rubber bushings to which the other support wheels 23 are attached. Thereby, the tension wheel attachment acts as a rocker arm. The tension wheels 23a are, similar to the other support wheels 23, contacting the ground via the endless track during normal operation of the vehicle. Furthermore, the tension wheel 23a and its suspension arrangement are configured such that, when the vehicle is reversed and the tension wheel 23a bumps into an obstacle, the tension wheel resiliently bounces such that an attack angle similar to the front attack angle between the drive wheel 24 and the front support wheel is formed between the tension wheel 23a and the rearmost support wheel of the other support wheels 23.

Said suspension device further includes a second suspension configuration in form of a gas hydraulic suspension configuration configured to resiliently connect said track assembly pair 20 with a centrally arranged centre beam 30 in form of a chassis beam.

Said suspension device further comprises a track assembly suspension configuration S1, S2 for resilient suspension of said track assembly pair 20. Said track assembly suspension configuration is configured to connect the respective track assembly 21 of the track assembly pair 20 with said centre beam 30 for track assembly suspension. Said track assembly suspension configuration comprises said second suspension configuration constituting a gas hydraulic suspension configuration.

Said track assembly suspension configuration comprises a front track assembly suspension unit S1 and a rear track assembly suspension unit S2 for the respective track assembly. Said track assembly suspension configuration comprises a trailing arm configuration comprising a front trailing arm configuration 52 and a rear trailing arm configuration 54.

Said front track assembly suspension unit S1 comprises said front trailing arm configuration 52 in form of an A-arm with a first arm portion 52a and a second arm portion 52b. Said front trailing arm configuration 52 is pivotally connectedly arranged in one end at a front region of said track assembly 21, more specifically with a front region of said track support beam 22. Said front trailing arm configuration 52 is pivotally attached at said front region of the track assembly 21, more specifically at a front region of said track support beam 22.

Said front trailing arm configuration 52 is pivotally connected to said track support beam 22 about an axis Z1 running substantially transverse to the longitudinal direction of the track assembly 21 and substantially in parallel with the driving shaft of said drive wheel 24.

Said front trailing arm configuration 52 is pivotally connected to said track assembly 21, more specifically to said track support beam 22, by means of a bushing coupling J1 comprising a rubber bushing.

Said first and second arm portions 52a, 52b of the A-arm of the front trailing arm configuration 52 are arranged to run from said one end at an angle relative to each other and to be pivotally secured at a distance from each other to a lower portion of said centre beam 30. The respective arm portion 52a, 52b of the A-arm is thus arranged to be pivotally attached at its end portion to a respective attachment region 34 of said lower portion of the centre beam 30.

The respective arm portion 52a, 52b of the A-arm is pivotally connected to said centre beam 30 about an axis X1 running substantially in parallel with the longitudinal direction of the centre beam 30.

The respective arm portion 52a, 52b of the A-arm of the front trailing arm configuration 52 is pivotally connected to said centre beam 30 by means of a bushing coupling J2.

Said rear track assembly suspension unit S2 comprises said rear trailing arm configuration 54 in form of a trailing arm 54 having a first end and an opposite second end. Said rear trailing arm configuration 54 is pivotally connectedly arranged in one end at a rear region of track assembly 21, more specifically to a rear region of said track support beam 22.

Said rear trailing arm configuration 54 is pivotally connected to said track assembly 21 about an axis X2 running substantially in parallel to the longitudinal direction of the track assembly 2, and consequently pivotable and rotatable about the axis X2.

Said rear trailing arm configuration 54 is pivotally connected to said track assembly 21, more specifically to a rear region of said track support beam 22 by means of a ball and socket joint B1.

Said second end of said trailing arm 54 of the rear trailing arm configuration 54 is arranged to be pivotally secured to a lower portion of said centre beam 30.

Said second end of said trailing arm 54 of the rear trailing arm configuration 54 is pivotally connected to said centre beam 30 about an axis X3 running substantially in parallel to the longitudinal direction of the centre beam 30, and consequently pivotable and rotatable about the axis X3.

Said second end of said trailing arm 54 of the rear trailing arm configuration 54 is pivotally connected to said centre beam 30 by means of a ball and socket joint B2.

According to an alternative variant, also the trailing arm of the rear trailing arm configuration is constituted by an A-arm, wherein said A-arm according to such an embodiment is connected to the central beam by means of a joint that permits longitudinal changes. According to an alternative variant, the trailing arm of the rear trailing arm configuration is constituted by an A-arm and the front trailing arm configuration of a trailing arm that is constituted by an arm in accordance with the trailing arm 54 described above.

The front trailing arm configuration 52 is dimensioned and configured to resist forces in form of impacts from the front and from the side in a substantially horizontal direction. The front trailing arm configuration 52 is further dimensioned and arranged to resist substantially vertical suspension forces from the support wheel suspension configuration of the track assembly 21. The front trailing arm configuration 52 designed as an A-arm having two spaced-apart attachment points on the centre beam 30 enables effective absorption of the forces caused by impacts from the front and from the side. Said bushing couplings J1, J2 with rubber bushing has vibration absorbing function in all planes and so reduces wear on the skid beam-type track support beam 22 of the track assembly 21 and the centre beam 30, and hence increased lifetime.

The rear trailing arm configuration 54 is dimensioned and configured to resist forces in the form of impacts from the front and from the side in a substantially horizontal direction. The rear trailing arm configuration 54 is further dimensioned and arranged to resist substantially vertical suspension forces from the support wheel suspension configuration of the track assembly 21. Said ball and socket joints B1, B2 of the rear trailing arm configuration 54 enables rotation/pivoting about multiple axis, serving to compensate for vertical movements of the skid beam-type track support beam 22, i.e. that the skid beam is moving up and down in its front and rear regions, thereby reducing strain in structures comprising the centre beam 30 and the skid beam 22 and the track assembly suspension units S1, S2. The ball and socket joints B1, B2 are configured to prevent to resist lateral forces.

Opposite front trailing arm configurations 52, i.e. a front trailing arm configuration 52 thus connected between the centre beam 30 and the skid beam 22 of the left track assembly 21 and an opposite front trailing arm configuration 52 thus connected between the centre beam 30 and the skid beam 22 of the right track assembly 21, are individually connected to the centre beam 30 so that they are allowed to pivot relative to each other as shown in FIG. 3c.

Said gas hydraulic suspension configuration comprises a hydraulic cylinder pair 62, 64 for the respective track assembly 21. Said hydraulic cylinder pair 62, 64 comprises a front hydraulic cylinder and a rear hydraulic cylinder. The front hydraulic cylinder 62 is comprised in said front track assembly suspension unit S1. The rear hydraulic cylinder 64 is comprised in said rear track assembly suspension unit S2.

The front and rear hydraulic cylinders 62, 64 have an inclination obliquely downwardly outwardly from the centre beam 30.

The front hydraulic cylinder 62 is at one end pivotally connected to said front trailing arm configuration 52 adjacent to its attachment to said track assembly 21/track support beam 22.

The front hydraulic cylinder 62 is in the opposite end pivotally connected to a side portion in a front region of said centre beam 30. Said side portion of the centre beam 30 is disposed at a higher level relative to said lower portion of the centre beam 30.

The front hydraulic cylinder 62 is pivotally connected to said side portion of the centre beam 30 about an axis X4 running in the longitudinal direction of the centre beam 30.

The front hydraulic cylinder 62 is pivotally connected to said side portion by means of a bushing coupling J3.

The rear hydraulic cylinder 64 is at one end pivotally connected to said rear trailing arm configuration 54 adjacent to its attachment to said track assembly 21/track support frame 22.

The rear hydraulic cylinder 64 is in the opposite end pivotally connected to a side portion of a rear region of said centre beam 30. Said side portion is disposed at a higher level relative to said lower portion of the centre beam 30.

The rear hydraulic cylinder 64 is pivotally connected to said side portion of the centre beam 30 about an axis X5 running in the longitudinal direction of the centre beam 30.

The rear hydraulic cylinder 64 is pivotally connected to said side portion by means of a bushing coupling J4.

Said front and rear hydraulic cylinders 62, 64 of the gas hydraulic suspension configuration consist respectively of a hydro-pneumatic combined spring and damper means comprising a hydraulic piston cylinder device and a gas spring device communicating with the hydraulic piston cylinder device via a restricting member, which gas spring device will be described in more detail with reference to FIG. 7.

Said front and rear hydraulic cylinders 62, 64 are arranged to be coupled to each other such that hydraulic flow is distributed between the front and rear hydraulic cylinders based on the force acting on the front and rear hydraulic cylinder 62, 64, respectively. Said hydraulic flow is arranged to be distributed such that the one of said front and rear hydraulic cylinders 62, 64 that absorbs the relatively higher force is compressed and the other is correspondingly expanded by hydraulic flow flowing from one of the hydraulic cylinders to the other 62, 64. FIG. 6b describes this in more detail.

Said front and rear hydraulic cylinders 62, 64 are configured to be supplied with a hydraulic medium from a hydraulic line configuration 70 arranged in said centre beam 30 and connected via the centre beam 30 to said front and rear gas hydraulic cylinders 62, 64 via a valve block 80 arranged in the centre beam 30. Said front and rear hydraulic cylinders 62, 64 are in fluid communication with the valve block.

Valves of said valve block 80 are arranged to regulate the hydraulic flow of hydraulic medium between the front and rear hydraulic cylinders 62, 64 based on the force acting on the front and rear gas hydraulic cylinders 62, 64. This is described in more detail with reference to FIG. 7b. According to one alternative, the hydraulic medium comprises oil.

The regulation of the hydraulic flow of hydraulic medium between the front and rear gas hydraulic cylinders 62, 64 connected between the centre beam 30 and the track assembly 21 on one side of the centre beam 30 is independent of the regulation of the hydraulic flow of hydraulic medium between the front and rear gas hydraulic cylinders 62, 64 connected between the centre beam 30 and the track assembly 21 on the opposite side of the centre beam 30.

Figure 7A:
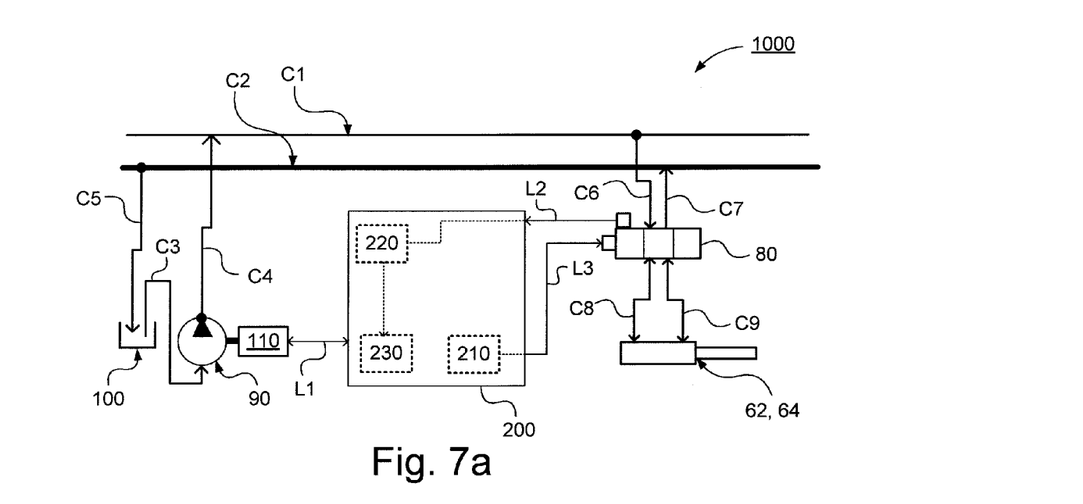
FIGS. 7a and 7b schematically illustrate a system for controlling gas hydraulic suspension of the suspension device according to an embodiment of the present invention.
Figure 7B:
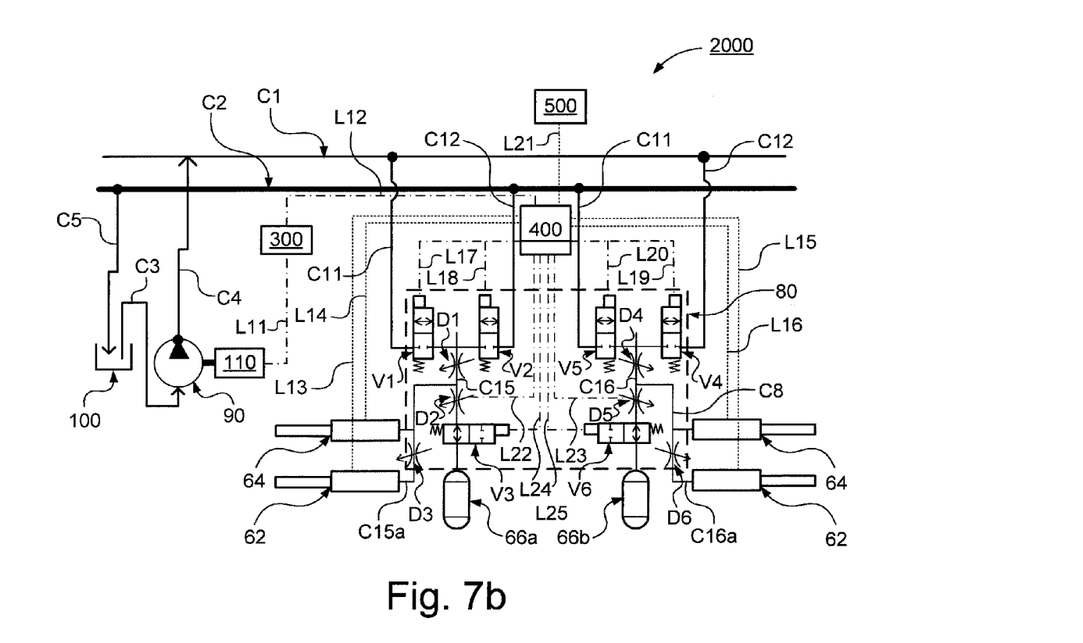

Said hydraulic medium is arranged to be pumped and thereby pressurized by means of pump device 90 for said supply, shown in FIG. 7a-b. Said hydraulic medium is arranged to be pumped from a reservoir 100, shown in FIG. 7a-b. Hereby, said front and rear hydraulic cylinders 62, 64 are connected to said hydraulic line configuration 70 via said valve block 80.

Said hydraulic line configuration 70 comprises hydraulic lines 71, 72, 73, 74 for regulation of hydraulic medium in the respective front and rear hydraulic cylinders 62, 64, connected to the respective hydraulic cylinders 62, 64 via said valve block 80. Said hydraulic line configuration 70 further comprises hydraulic lines connected through the valve block 80 to steering cylinders 38a, 38b for steering the tracked vehicle 10.

Said gas hydraulic suspension configuration further comprises a first gas accumulator 66a arranged in the centre beam 30 and configured to provide a suspension function of the front and rear hydraulic cylinders 62, 64 connected between the centre beam 30 and the track assembly 21 on one side of the centre beam 30.

Said gas hydraulic suspension configuration further comprises a second gas accumulator 66b arranged in the centre beam 30 and configured to provide a suspension function of the front and rear hydraulic cylinders 62, 64 connected between the centre beam 30 and the track assembly 21 on the opposite other side of the centre beam 30.

Said gas hydraulic suspension configuration further comprises restrictor valves, see FIG. 7b, arranged in said valve block 80 and configured to provide a damping function of said front and rear hydraulic cylinders 62, 64 during propulsion of the vehicle.

Figure 6A:
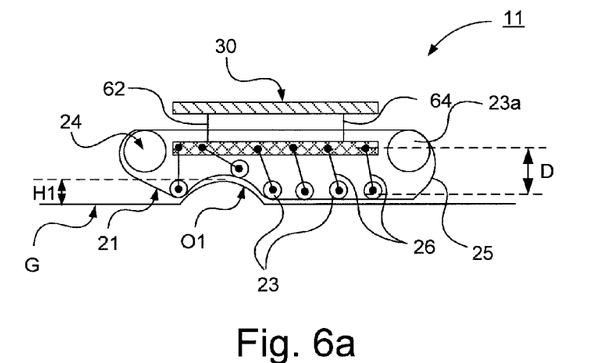
FIG. 6a schematically illustrates a side view of a vehicle unit with suspension device according to an embodiment of the present invention in a first suspension application.
Figure 6B:
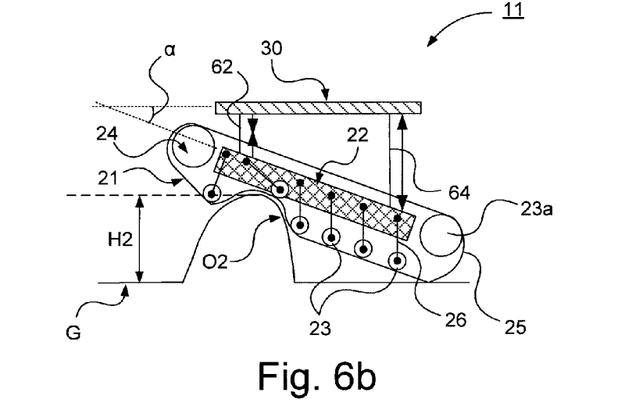
FIG. 6b schematically illustrates a side view of the vehicle unit in FIG. 6a in a second suspension application.

FIG. 6a schematically illustrates a side view of a vehicle unit 11 with the suspension device according to an embodiment of the present invention in a first suspension application.

The vehicle unit 11 comprises track assemblies with support wheel suspension configurations and a centre beam 30 connected to a gas hydraulic suspension configuration. The track assembly 21 has at least one drive wheel 24, a plurality of support wheels 23 and an endless track 25, wherein said drive wheel 24 and said plurality of support wheels 23 are rotatably secured to a track support beam 22 of the track assembly 21, wherein the track support beam 22 is constituted by a skid beam. Said at least one drive wheel 24 is arranged to drive said endless track 25 running over said at least one drive wheel 24 and said plurality of support wheels 23.

Said support wheel suspension configuration comprises rocker arms 26, wherein the respective rocker arm 26 is connected to a support wheel 23 of said set of support wheels 23 to said skid beam kind of track support beam 22. Said rocker arms 26 are configured such that forces acting on said plurality of support wheels 23 cause resilient oscillation of said rocker arms 26.

Said rocker arms 26 are configured to oscillate between a first position such that a first distance is formed between the track support beam 22 and the support wheel 23 and a second bottomed position wherein said support wheel 23 bottoms out in relation to said track support beam 22. Said first position and second position of the rocker arm 26 form a distance D. The bottomed position is, according to one alternative, assumed when the skid beam kind of track support beam 22 is brought into contact with the endless track due to the support wheels 23, by means of said force, being pushed up along the side of the skid beam.

According to this suspension application, a vehicle unit 11 of a vehicle travels over an obstacle O1 of a first type with a dimension reaching to a first height H1 above ground. Said first height H1 of the obstacle O1 is smaller than the vertical distance D between said first position of the rocker arm 26 and the second bottomed position. Said obstacle O1 has a first height H1 making the distance traveled by the rocker arm 26 relative to the first position less than the distance D, such that the rocker arm does not reach the bottomed position.

Thus, said support wheel suspension configuration of the suspension device is configured to oscillate such that said rocker arms 26 connected to the support wheels 23 travelling over the obstacle O1 oscillate resiliently due to the increasing force acting on the support wheels 23 travelling over the obstacle O1, such that these support wheels 23 are pushed up relative to the track support beam 22 of the track assembly 21, substantially corresponding to the height H1 of said obstacle O1. Thereby, the track support beam 22 and so the vehicle unit 11 is held substantially horizontal/in parallel with the ground plane G.

Generally, said gas hydraulic suspension configuration is configured to cooperate with said support wheel suspension configuration based on force acting on said track assembly pair. Said cooperation arises when force acting on said pair of track assemblies is absorbed by said support wheel suspension configuration and any remaining force transmitted to said track support beam is absorbed by said suspension configuration.

Consequently, the support wheel suspension configuration of the support wheels will cooperate with the gas hydraulic suspension configuration comprising said front and rear hydraulic cylinders 62, 64 when force during ground contact also is transferred to track support beam, i.e. when a certain pressure is applied to the track assembly during propulsion of the vehicle the support wheel suspension configuration and the gas hydraulic suspension configuration will cooperate.

Support wheels 23 of the support wheel suspension configuration do not have to bottom out in order for the gas hydraulic suspension configuration to cooperate resiliently. When driving the vehicle in a long inclined plane, several support wheels 23 of the support wheel suspension configuration will be resiliently influenced, whereby the pressure of the gas hydraulic suspension configuration is increased and cooperation with the support wheel suspension configuration takes place.

FIG. 6b schematically illustrates a side view of the vehicle unit in FIG. 6a in a second suspension application.

According to this suspension application a vehicle unit 11 of a vehicle travels over an obstacle O2 of a second type with a dimension reaching to a second height H2 above ground level, exceeding said first height H1 of the obstacle O1 of said first type illustrated in FIG. 6a. Said second height H2 of the obstacle O2 exceeds the vertical distance D between said first position of the rocker arm 26 and the second bottomed position.

Hereby, said support wheel suspension configuration of the suspension device is configured to oscillate such that said rocker arms 26 connected to support wheels travelling over the obstacle O2 of said second type oscillate resiliently due to the increasing force acting on the support wheels 23 traveling over the obstacle O2, such that these support wheels 23 are pushed up relative to the track support beam 22 of the track assembly 21 until said support wheel suspension configuration bottoms out, i.e. until one or more rocker arms 26 reaches its bottomed position.

When the height of the obstacle O2 of said second type exceeds the distance D between said first position of the rocker arm 26 and the second bottomed position, the track assembly will hereby rise when the support wheel suspension configuration bottoms out.

The gas hydraulic suspension configuration of the vehicle unit 11 is hereby configured to cooperate with said support wheel suspension configuration such that the hydraulic flow is redistributed between the front and rear hydraulic cylinders 62, 64 when said support wheel suspension configuration bottoms out, i.e. when one or more support wheels 23 of the support wheel suspension configuration bottoms out.

In this case, when the support wheel suspension configuration bottoms out by the rocker arm 26 being sprung to its bottomed position and the track assembly 21 rises, the force acting on the front hydraulic cylinder 62 will be greater than the force acting on the rear hydraulic cylinder 64 such that hydraulic medium is forced through said connection such that a hydraulic flow from the front hydraulic cylinder 62 to the rear hydraulic cylinder 64 is generated, whereby the front hydraulic cylinder 62 is compressed and the rear hydraulic cylinder 64 correspondingly expanded.

Thus, hydraulic flow is in this situation arranged to distributed such that the front and the hydraulic cylinder 62 that in this case absorbs a relatively larger force is compressed, and the rear hydraulic cylinder 64 is correspondingly expanded due to flow of hydraulic flow from the front hydraulic cylinder 62 to the rear hydraulic cylinder 64, wherein an angle α is formed between said track support beam 22 and said centre beam 30.

The piston rod of the front hydraulic cylinder 62 is thus compressed due to the relatively larger force acting on the front region of the track assembly 21 adjacent to the front hydraulic cylinder 62, and the piston rod of the rear hydraulic cylinder 64 is correspondingly expanded through the increase in pressurised hydraulic medium supplied to the rear hydraulic cylinder 64.

Hereby, the vehicle unit 11 is held substantially horizontal/parallel relative to the ground plane G despite that the track assembly 21/track support beam 22 rises when passing over the obstacle O2 of said second type.

According to one embodiment, said first type of obstacle O1 is an obstacle having a height of about 200 mm, and said second type of obstacle has a height of about 200-400 mm.

The suspension device thus provides, through said gas hydraulic suspension configuration, a bogie function in combination with said support wheel suspension for improved mobility and increased comfort. Furthermore, the load on the vehicle in form of vibrations, shocks and impacts are reduced.

Figure 6C:
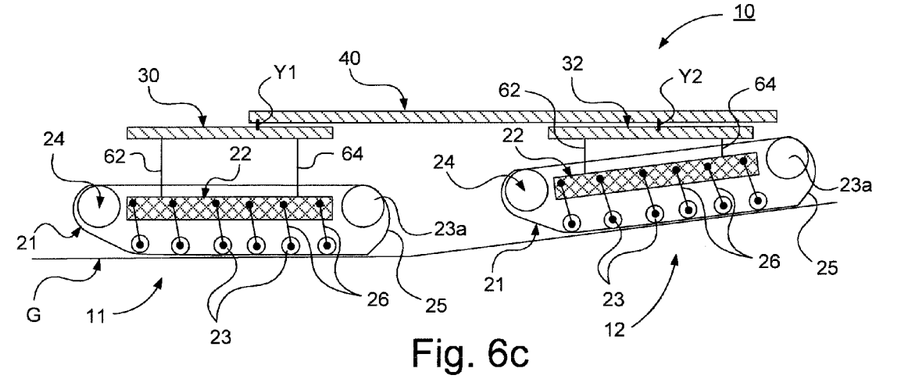
FIG. 6c schematically illustrates a side view of vehicle units with vehicle suspension device according to an embodiment of the present invention in a third suspension application.

FIG. 6c schematically illustrates a side view of the vehicle units 11, 12 of the vehicle 10 with a suspension device according to an embodiment of the present invention in a third suspension application. The vehicle 10 comprises herein a front vehicle unit 11 and a rear vehicle unit 12, pivotally connected to each other via a rigid load-carrying frame 40. The front and rear vehicle units 11, 12 comprise track assemblies 21 corresponding to the track assemblies of the vehicle unit 11 described with reference to FIGS. 6a and 6b, and corresponding suspension device comprising said gas hydraulic suspension configuration comprising front and rear hydraulic cylinders 62, 64.

The tracked vehicle 10 is pivotally connected to said front vehicle unit 11 via a front vertical steering joint Y1 arranged centrally relative to the longitudinal direction of the front vehicle unit 11 and pivotally connected to said rear vehicle unit 12 via a rear vertical steering joint Y2 arranged centrally relative to the longitudinal direction of the rear vehicle unit 12.

According to this suspension application the vehicle is traveling off-road, wherein the front vehicle unit 11 has leveled out and the rear vehicle unit 12 is in a downhill.

The suspension device comprises a non-showed control unit configured to control said gas hydraulic suspension configuration based on information received from the inclination determining means. FIG. 7a-b illustrate control of the gas hydraulic suspension configuration by means of the control unit.

Said control unit is configured to control said gas hydraulic suspension configuration such that the position of the track assemblies relative to the centre beam 30, 32 is controlled to compensate for inclination. Hereby, according to this alternative, said front and rear hydraulic cylinders 62, 64 of the front vehicle unit 11 are regulated such that the centre beam 30 is raised relative to its track assemblies 21 and said front hydraulic cylinder 62 of the rear vehicle unit 12, such that the front part of the centre beam 32 of the rear vehicle unit 12 is raised relative the track assembly 21 and is horizontal, and said rear hydraulic cylinder 64 of the rear vehicle unit 12 is lowered relative to the track assembly such that the rear region of the centre beam 32 is raised such that the centre beam 32 is horizontal and such that the load-carrying frame 40 that protrudes above the front and rear vehicle unit 11, 12 is held substantially horizontal.

FIG. 2 illustrates a variant in which the vehicle is driven in a slide slope, wherein said control unit regulates said gas hydraulic suspension configuration such that the front and rear hydraulic cylinders 62, 64 on the right side are expanded and the front and rear hydraulic cylinders 62, 64 on the left side are compressed such that the centre beam 30 and thereby the load-carrying frame 40 with load remains substantially horizontal relative to the inclined ground plane G.

FIG. 7a schematically illustrates a system 1000 for controlling the gas hydraulic suspension of the suspension device according to an embodiment of the present invention, and FIG. 7b a system 2000 for controlling the gas hydraulic suspension of the suspension device in more detail, according to an embodiment of the present invention.

The system 1000 comprises said gas hydraulic suspension configuration.

The system 1000 comprises a hydraulic line configuration for supplying the gas hydraulic suspension configuration with hydraulic medium.

The hydraulic line configuration comprises a pressure line C1 to which pressurized hydraulic medium is arranged to be supplied for the supply to said gas hydraulic suspension configuration.

The hydraulic line configuration further comprises a return line C2 configured to receive hydraulic medium from the gas hydraulic suspension configuration.

The system further includes a hydraulic reservoir 100 adapted to hold hydraulic medium for said hydraulic line configuration. Said hydraulic reservoir 100 is arranged to receive hydraulic medium from said return line C2.

The system further comprises a pump unit 90 for pumping hydraulic medium from said hydraulic reservoir 100 to said pressure line C1. Said pump unit 90 is arranged to pressurize said hydraulic medium.

The system further comprises a pump drive unit 110 for operating said pump unit 90 for pumping said hydraulic fluid. Said pump drive unit 110 is, according to one alternative, constituted by an electric machine.

Said pump unit 90 is arranged to pump hydraulic fluid from the reservoir 100 via a line C3. Said pump unit 90 is arranged to pump hydraulic medium to the pressure line C1 via a line C4.

Said hydraulic line configuration comprises a reservoir return line C5 in fluid connection with the return line C2, arranged to bring back the hydraulic medium to said hydraulic reservoir 100.

Said hydraulic line configuration comprises a supply line arrangement C6 in fluid connection with the pressure line C1, for the supply of pressurized hydraulic medium to said gas hydraulic suspension configuration.

Said hydraulic line configuration comprises a reverse line arrangement C7 in fluid connection with the return line C2, for returning the pressurized hydraulic medium from said gas hydraulic suspension configuration to the return line C2.

Said gas hydraulic suspension configuration comprises a valve block 80. Said valve block 80 is in hydraulic connection with said supply line arrangement C6. Said valve block 80 is further in hydraulic connection with said reverse line arrangement C7 for returning the fluid medium via said valve block 80.

Said gas hydraulic suspension configuration comprises a hydraulic cylinder arrangement 62, 64 which may comprise the front and rear hydraulic cylinders 62, 64.

Said hydraulic line configuration comprises a first line arrangement C8 in fluid connection with the hydraulic cylinder arrangement 62, 64, for fluid communication between the hydraulic cylinder arrangement 62, 64 and a second line arrangement C9 in fluid connection with the hydraulic cylinder arrangement 62, 64, wherein said first and second line arrangements C8, C9 are configured for fluid communication between the hydraulic cylinder arrangement 62, 64 and the valve block 80 for regulation of pressure and hydraulic flow in the hydraulic cylinder arrangement 62, 64.

The system comprises a so called load-sensing system (eng. Load Sensing System).

The system comprises an electronic control unit 200 for controlling the load-sensing system, including controlling the pump drive unit 110 and the valve block 80.

Said electronic control unit 200 is signal-connected to the pump drive unit 110 via a link L1. Said electronic control unit is arranged to receive, via the link L1, a signal from the pump drive unit 110 representing pump operation data for regulation of the pressure in the pressure line C1.

Said electronic control unit is arranged to transmit, via the link L1, a signal to the pump drive unit 110 representing the pump operation data for operation of the pump.

The electronic control unit 200 is signal-connected to the valve block via a link L2. The electronic control unit is arranged to receive, via a link L2, a signal from the valve block representing load data on the current load.

The electronic control unit 200 is signal-connected to the valve block 80 via a link L3. The electronic control unit is arranged to transmit a signal to the valve block 80 representing control data for controlling the opening/closing of the valves of the valve block 80 based on, inter alia, said load data and data from inclination sensors for controlling said hydraulic cylinder configuration 62, 64.

The electronic control unit 200 comprises, according to one alternative, a node 210 for said signal representing load data from the valve block via the link L2. The electronic control unit 200 further comprises a node 220 for controlling the valve block 80 and is hence signal-connected via the link L3. The node 220 is signal-connected to a control unit 230 of the electronic control unit 200.

The system 2000 is essentially a more detailed version of the system 1000. The system 2000 comprises said gas hydraulic suspension configuration, reservoir 100, pump unit 90, pump drive unit 110, valve block 80, pressure line C1, return line C2 and the lines C3, C4 and C5.

The electronic control unit 300, 400 of the system 2000 is illustrated as a control unit 300 of the pump drive unit and a suspension control unit 400.

The control unit 300 of the pump drive unit is signal-connected to the pump drive unit via a link L11 and the suspension control unit 400 via a link L12.

The suspension device comprises a front and a rear hydraulic cylinder 62, 64 for the right track assembly and corresponding front and rear hydraulic cylinders 62, 64 for the left track assembly of the vehicle 10 of the present invention.

The valve block 80 comprises a level increase valve V1 for increasing the level of the hydraulic cylinder pair 62, 64 of the left track assembly, and a level increase valve V4 for increasing the level of the hydraulic cylinder pair 62, 64 of the right track assembly.

The valve block 80 comprises a level decrease valve V2 for decreasing the level of the hydraulic cylinder pair 62, 64 of the left track assembly, and a level decrease valve V5 for decreasing the level of the hydraulic cylinder pair 62, 64 of the right track assembly.

The valve block 80 comprises a suspension valve V3 for suspension of the hydraulic cylinder pair 62, 64 of the left track assembly, and a suspension valve V6 for suspension of the hydraulic cylinder pair 62, 64 of the right track assembly.

The valve block 80 comprises a damper valve D1 for damping during level regulation of the hydraulic cylinder pair 62, 64 of the left track assembly, and a damper valve D4 for damping during level regulation of the hydraulic cylinder pair 62, 64 of the right track assembly.

The valve block 80 comprises a damper valve D2 for damping during resilient oscillation of the hydraulic cylinder pair 62, 64 of the left track assembly, and a damper valve D5 for damping during resilient oscillation of the hydraulic cylinder pair 62, 64 of the right track assembly.

The valve block 80 comprises a damper valve D3 for damping during bogie function of the hydraulic cylinder pair 62, 64 of the left track assembly, and a damper valve D6 for damping during bogie function of the hydraulic cylinder pair 62, 64 of the right track assembly.

Said hydraulic line configuration comprises a supply line C11 in fluid connection with the pressure line C1, for the supply of pressurized hydraulic medium to the level increase valve V1 of the left track assembly, and a supply line C13 in fluid connection with the pressure line C1, for the supply of pressurized hydraulic medium to the level increase valve V4 of the right track assembly.

Said hydraulic line configuration comprises a reverse line C12 in fluid connection with the return line C2, for returning pressurized hydraulic medium from the level decrease valve V2 of the left track assembly to the return line C2, and a reverse line C14 in fluid connection with the return line C2, for returning pressurized hydraulic medium from the level decrease valve V5 of the left track assembly to the return line C2.

Said hydraulic line configuration comprises a line arrangement C15 in fluid connection with the front and rear hydraulic cylinders 62, 64 of the left track assembly, for fluid communication between the hydraulic cylinders and the level regulation valves V1, V2 of the valve block 80 for regulation of the pressure in the hydraulic cylinder arrangement 62, 64. The line C15 comprises a line portion C15a in fluid connection with the front and rear hydraulic cylinders 62, 64 via said damper valve V3 such that hydraulic flow is distributed over the front and rear hydraulic cylinders 62, 64 based on the force acting on the front and rear hydraulic cylinders 62, 64.

In a corresponding manner, said hydraulic line configuration comprises a line arrangement C16 in fluid connection with the front and rear hydraulic cylinders 62, 64 of the right track assembly, for fluid communication between the hydraulic cylinders and the level regulation valves V4, V5 of the valve block 80 for regulation of the pressure in the hydraulic cylinder arrangement 62, 64. The line C16 comprises a line portion C16a in fluid connection with the front and rear hydraulic cylinders 62, 64 via said damper valve V6 such that hydraulic flow is distributed over the front and rear hydraulic cylinders 62, 64 based on the force acting on the front and rear hydraulic cylinders 62, 64.

The system further comprises a gas accumulator 66a for the left track assembly, and a gas accumulator 66b for the right track assembly, wherein the gas accumulators 66a, 66b are configured to provide suspension function for the hydraulic cylinders 62, 64 of the left and right track assembly, respectively, i.e. on left and right side, respectively, of the vehicle unit of the vehicle. The gas accumulator 66a for the left track assembly is connected to the suspension valve V3 for the left track assembly, and the gas accumulator 66b of the right track assembly is connected to the suspension valve V6 for the right track assembly.

The line C15 for the left track assembly is further in fluid connection with the suspension valve V3 of the left track assembly for fluid communication with the gas accumulator 66a for suspension function of the front and rear hydraulic cylinders 62, 64 of the left track assembly.

The line C16 for the right track assembly is further in fluid connection with the suspension valve V6 of the right track assembly for fluid communication with the gas accumulator 66b for suspension function of the front and rear hydraulic cylinders 62, 64 of the right track assembly.

Said pump drive control unit 300 is arranged to receive, via the link L11, a signal from the pump drive unit 110 representing pump operation data for regulation of the pressure in the pressure line C1.

Said pump drive control unit 300 is arranged to, via the link L11, transmit a signal to the pump drive unit 110 representing the pump operation data for operation of the pump 90.

Said suspension control unit 400 is signal-connected to the pump drive control unit 300 via a link L12. The suspension control unit 400 is arranged to, via the link L12, transmit a signal to the suspension control unit 400 representing load data on the current load of the vehicle.

For the left track assembly, i.e. for the gas hydraulic suspension configuration on the left side of the vehicle unit of the vehicle, the suspension control unit 400 is signal-connected to the front hydraulic cylinder 62 via a link L13 and with the rear hydraulic cylinder 64 via a link L14. The suspension control unit 400 is arranged to receive, via the link L13, a signal from the front hydraulic cylinder 62 representing piston position data for level position of the piston of the front hydraulic cylinder 62. The suspension control unit 400 is arranged to receive, via the link L14, a signal from the rear hydraulic cylinder 64 representing piston position data for level position of the piston of the rear hydraulic cylinder 64.

For the right track assembly, i.e. for the gas hydraulic suspension configuration on the right side of the vehicle unit of the vehicle, the suspension control unit 400 is signal-connected to the front hydraulic cylinder 62 via a link L15 and with the rear hydraulic cylinder 64 via a link L16. The suspension control unit 400 is arranged to receive, via the link L15, a signal from the front hydraulic cylinder 62 representing piston position data for level position of the piston of the front hydraulic cylinder 62. The suspension control unit 400 is arranged to receive, via the link L16, a signal from the rear hydraulic cylinder 64 representing piston position data for level position of the piston of the rear hydraulic cylinder 64.

For the left track assembly, i.e. for the gas hydraulic suspension configuration on the left side of the vehicle unit of the vehicle, the suspension control unit 400 is signal-connected to the level increase valve V1 via a link L17, and to the level decrease valve V2 via a link L18.

For the right track assembly, i.e. for the gas hydraulic suspension configuration on the right side of the vehicle unit of the vehicle, the suspension control unit 400 is signal-connected to the level increase valve V4 via a link L19, and to the level decrease valve V5 via a link L20.

The system further comprises inclination determining means 500 for determining the inclination of a vehicle unit of the vehicle. According to one embodiment, said inclination determining means 500 comprises a gyro.

The suspension control unit 400 is signal-connected to said inclination determining means 500 via a link L21. The suspension control unit 400 is arranged to receive, via the link L21, a signal representing inclination data for the inclination of the vehicle unit, including the side tilt of the vehicle unit.

The suspension control unit 400 is arranged to process said piston position data from the right and left front and rear hydraulic cylinders of the right and left track assemblies, as well as said inclination data in order to, by means of said level regulation valves V1, V2, V4, V5, regulate the level of the front and rear hydraulic cylinder of the right and left track assemblies in order to thus regulate the inclination of the vehicle unit of the vehicle, for example such that the centre beam of the vehicle unit is with held in a substantially horizontal position during side slope driving. Said level regulation for inclination adjustment of the vehicle unit is, according to one embodiment, based on a command from the vehicle operator via a non-shown vehicle actuator. Said level regulation for inclination adjustment of the vehicle unit is, according to one embodiment, performed automatically.

The suspension control unit 400 is arranged to transmit signals via the links L17, L18, L19, L20 to the level regulating valves V1, V2, V4, V5 representing level regulation data for inclination adjustment of the vehicle unit to a substantially horizontal position. During side slope driving, adjustment is made by adjusting the piston position of the front and rear hydraulic cylinders 62, 64 for raising the lower side of the vehicle unit through the supply of hydraulic medium, and the piston position of the front and rear hydraulic cylinders 62, 64 for lowering the opposite side of the vehicle unit by removal of hydraulic medium.

The suspension control unit 400 is signal-connected to said damper valve D2 via a link L22. The suspension control unit 400 is signal-connected to said damper valve D5 via a link L23. The suspension control unit 400 is signal connected to said suspension valve V3 via a link L24. The suspension control unit 400 is signal-connected to said suspension valve V3 via a link L25.

The suspension control unit 400 is arranged to transmit a signal via the link L22 to the damper valve D2 for degree of damping based on data including load data for load of the vehicle and damping data for adjusting the stiffness of the damping. The adjustment of the stiffness of the damping is, according to one embodiment, based on the speed of the vehicle, the type of terrain in which the vehicle is traveling. At high speeds, a stiff damping is desired in order for the vehicle to give the impression of being stable and not sway too much. When driving the vehicle in terrain, less damping is desired for increased comfort. According to one embodiment, damping adjustment is arranged to be performed automatically based on speed, and/or manually based on the type of terrain.

The suspension control unit 400 is arranged to transmit a signal via the link L23 to the damper valve D5 for degree of damping based on data including load data on the load of the vehicle.

The suspension control unit 400 is arranged to transmit a signal via the link L24 to the suspension valve V3, and to transmit a signal via the link L25 to the suspension valve V6 for degree of damping based on data including load data on the load of the vehicle, and suspension data for adjustment of the stiffness of the suspension. The adjustment of the stiffness of the suspension is, according to one embodiment, based on the speed of the vehicle, the type of terrain in which the vehicle is traveling. At high speeds, a stiff suspension is desired in order for the vehicle to give the impression of being stable and not sway too much. When driving the vehicle in terrain, less damping is desired for increased comfort. According to one embodiment, damping adjustment is arranged to be performed automatically based on speed, and/or manually based on the type of terrain.

The respective vehicle unit 11, 12 of the vehicle 10 of the present invention comprises a valve block 80, an inclination determining means 500, gas accumulators 66a, 66b, and front and rear hydraulic cylinders 62, 64 arranged on the respective side of the vehicle unit 11, 12.

Above there has been described a suspension device having a suspension configuration constituted by a gas hydraulic suspension configuration configured to connect track assemblies of a vehicle unit of the vehicle with a centrally arranged centre beam. The gas hydraulic suspension configuration comprises a pair of springs for the respective track assembly, which pair of springs comprises a front and a rear spring strut, wherein the pair of springs is constituted by a pair of hydraulic cylinders and wherein the front and rear spring struts are constituted by a front and rear hydraulic cylinder.

According to an alternative embodiment, the suspension configuration is constituted by a mechanical suspension configuration, for example in accordance with a mechanical suspension configuration of a car, wherein the front and rear spring struts are constituted by a front and a rear mechanical strut which according to one alternative comprises a helical spring member.

According to an alternative embodiment, the suspension configuration is constituted by an air suspension configuration, for example in accordance with an air suspension configuration of a truck, wherein the front and rear spring struts are constituted by a front and a rear air suspension connected spring strut.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A suspension device for a tracked vehicle, which vehicle comprises at least one track assembly pair, where each track assembly of the track assembly pair comprises a track support beam, at least one drive wheel, a plurality of support wheels and an endless track, wherein said at least one drive wheel and said plurality of support wheels are rotatably secured to said track support beam, wherein said at least one drive wheel is arranged to drive said endless track running over the at least one drive wheel and said plurality of support wheels, wherein the suspension device comprises a first suspension configuration constituting a support wheel suspension configuration configured to resiliently secure said support wheels to said track support beam, and a second suspension configuration configured to connect said track assembly pair with a centrally arranged centre beam, and wherein said second suspension configuration comprises a pair of springs for the respective track assembly, which the pair of springs comprises a front strut and a rear strut, and said track assembly pair is configured to be secured to said centre beam via a track assembly suspension configuration comprising said second suspension configuration, wherein said second suspension configuration is constituted by a gas hydraulic suspension configuration, wherein said gas hydraulic suspension configuration comprises a pair of hydraulic cylinders for the respective track assembly, which pair of hydraulic cylinders comprises a front and a rear hydraulic cylinder arranged to be connected such that hydraulic flow is distributed between the front and the rear hydraulic cylinder based on a force acting on the front and rear hydraulic cylinder, respectively.

2. The suspension device of claim 1, wherein said support wheel suspension configuration comprises rocker arms connecting said plurality of support wheels and said track support beam, wherein said rocker arms are configured such that forces acting on said plurality of support wheels cause resilient oscillation of said rocker arms.

3. The suspension device of claim 1, wherein said second suspension configuration is configured to cooperate with said support wheel suspension configuration based on force acting on said track assembly pair.

4. The suspension device of claim 3, wherein said cooperation is arranged to take place such that force acting on said track assembly pair is absorbed by said support wheel suspension configuration and any remaining force transmitted to said track support beam is absorbed by said second suspension configuration.

5. The suspension device of claim 1, wherein said hydraulic flow is arranged to be distributed such that one of said front and rear hydraulic cylinders that absorbs a relatively higher force is compressed and another of said front and rear hydraulic cylinders is correspondingly expanded by hydraulic flow flowing from said one of said front and rear hydraulic cylinders to said another of said front and rear hydraulic cylinders, whereby an angle is formed between said track support beam and said centre beam.

6. The suspension device of claim 1, wherein said front hydraulic cylinder is at one end pivotally connected to a front side region of said centre beam and at an opposing other end of the front hydraulic cylinder to a front region of said track support beam, in connection with a front trailing arm configuration, and wherein said rear hydraulic cylinder at one end is pivotally connected to a rear side region of said centre beam and at an opposing other end of the rear hydraulic cylinder to a rear region of said track support beam.

7. The suspension device of claim 1, further comprising a controller configured to control said hydraulic suspension configuration based on information received from an inclination determining device.

8. The suspension device of claim 7, wherein said controller is configured to control said hydraulic suspension configuration such that a position of the track assemblies relative to the centre beam is adjusted to compensate for inclination.

9. The suspension device of claim 1, wherein said track assembly suspension configuration comprises a front trailing arm configuration and a rear trailing arm configuration for the respective track assembly, wherein the front trailing arm configuration at one end is articulately connected at a lower attachment of a front region of said centre beam and at an opposing other end of the front trailing arm configuration at a front region of said track support beam, and wherein the rear trailing arm configuration at one end is articulately connected at a lower attachment of a rear region of said centre beam and at an opposing end of the rear trailing arm configuration at a rear region of said track support beam.

10. The suspension device of claim 9, wherein at least one of said front and rear trailing arm configurations is formed as an A-arm.

11. The suspension device of claim 1, wherein said track support beam is a skid beam.

12. A tracked vehicle, comprising at least one suspension device of claim 1.

13. The tracked vehicle of claim 12, comprising at least two articulated vehicle units, each of said vehicle units comprising two track assemblies connected to respective sides of a centre beam.

14. The tracked vehicle of claim 13, wherein said tracked vehicle comprises a load-carrying frame pivotally connected to a front vehicle unit via a front vertical steering joint arranged centrally relative to a longitudinal direction of the front vehicle unit and pivotally connected to a rear vehicle unit via a rear vertical steering joint arranged centrally relative to the longitudinal direction of the rear vehicle unit.

15. The tracked vehicle of claim 12, wherein said tracked vehicle is a forestry machine.

16. The tracked vehicle of claim 12, wherein said tracked vehicle is a forwarder.

17. The tracked vehicle of claim 12, wherein said tracked vehicle is hybrid-powered.

\* \* \* \* \*